United States Patent [19]
Mewhinney

[11] 3,794,310
[45] Feb. 26, 1974

[54] HYDROPNEUMATIC ENERGY ABSORBING UNIT

[75] Inventor: Albert B. Mewhinney, Dayton, Ohio

[73] Assignee: General Motors Corporation, Detroit, Mich.

[22] Filed: Oct. 27, 1972

[21] Appl. No.: 301,507

[52] U.S. Cl. .................. 267/139, 293/70, 293/89, 213/223
[51] Int. Cl. .................................................. F16f5/00
[58] Field of Search ..... F16f/5/00; 293/1, 9, 24, 60, 293/70, 73, 85, 86, 89, DIG. 2; 267/264 R, 116, 139, 146; 213/43, 223

[56] References Cited
UNITED STATES PATENTS
3,700,273  10/1972  Jackson et al. ..................... 267/139
3,718,356  10/1971  Gabella ............................... 293/85

*Primary Examiner*—James B. Marbert
*Attorney, Agent, or Firm*—Saul Schwartz

[57] ABSTRACT

A hydropneumatic energy absorbing unit of the type including a cylinder tube subassembly having a piston tube subassembly telescopically disposed thereon and further including a valve arrangement for altering the energy absorbing characteristics of the unit and for retarding the rate of relative telescopic extension of the piston tube subassembly. The valve arrangement includes a valve disc with a circular aperture therein disposed on the piston tube subassembly, and an adjusting member mounted on the piston tube subassembly with a cylindrical boss portion projecting into the circular aperture. The boss portion cooperates with the disc in defining an annular throttling orifice the area of which is proportional to the pressure of the working fluid of the unit. The energy absorbing characteristics of the unit are adjustable through progressive movement of the boss portion further into the circular aperture.

3 Claims, 4 Drawing Figures

PATENTED FEB 26 1974 3,794,310

HYDROPNEUMATIC ENERGY ABSORBING UNIT

This invention relates generally to hydropneumatic energy absorbing units and more particularly to an adjustable valving arrangement for altering the operating characteristics of the units.

The primary feature of this invention is that it provides an improved energy absorbing unit of the hydropneumatic type, the unit being particularly adapted for supporting a collision bumper on an automobile body or frame. Another feature of this invention is that it provides an improved energy absorbing unit including a pair of telescopically related tube assemblies defining a primary chamber in one tube assembly, a free piston in the other tube assembly defining a gas chamber for effecting automatic extension, and an adjustable valve arrangement on the inboard end of the other tube assembly, the valve arrangement defining a combination piston and valve adapted for throttling a working fluid from the primary chamber through a variable area orifice during telescopic collapse of the tube assemblies to effect primary energy absorption and through a fixed area orifice during telescopic extension of the tube assemblies to retard the rate of extension. Yet another feature of this invention resides in the provision of a valve arrangement including a valve element resiliently biased toward a closed position and exposed to the pressure in the primary chamber so that increasing pressure effects movement of the valve element through a plurality of open positions and an adjusting member selectively movable relative to the valve member and adapted for altering the area of the flow orifice defined by the valve arrangement in any open position of the valve element. A further feature of this invention resides in the provision of a valve arrangement including a flexible valve disc having a circular aperture therein and an adjusting member having a cylindrical boss thereon, the disc being rigidly attached to the other tube assembly and the adjusting member being supported on the latter for longitudinal movement between a plurality of positions wherein the boss projects progressively deeper into the circular aperture so that the area of the annular flow orifice defined between the aperture and the boss is progressively reduced in any of the open positions of the valve disc. A still further feature of this invention resides in the provision in the valve arrangement of a circular end cap having an annular ridge thereon, the end cap being adapted for welded connection to the other tube assembly with the valve disc rigidly captured between an end surface of a portion of the tube assembly and the annular ridge.

These and other features of this invention will be readily apparent from the following specification and from the drawings wherein.

Figure 1:
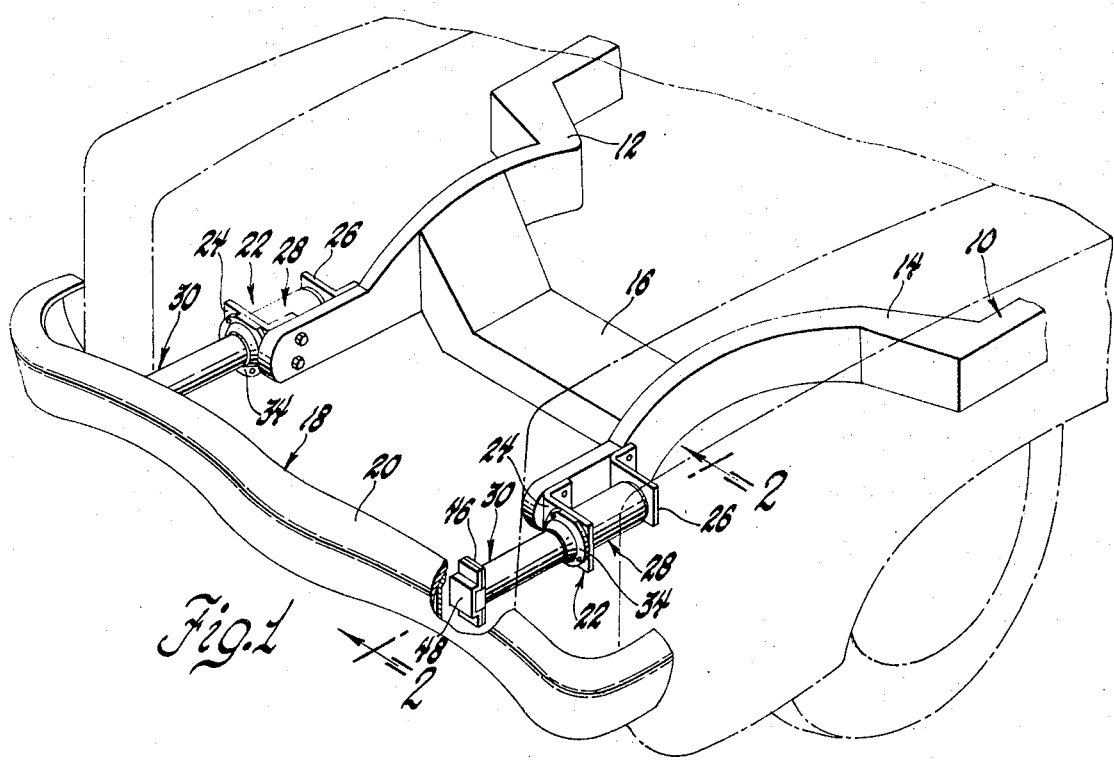
FIG. 1 is a perspective view of the forward portion of an automobile frame having a collision bumper structure supported thereon by a pair of energy absorbing units according to this invention.

Referring now to FIG. 1 of the drawings, thereshown in simplified form is an automobile frame designated generally 10 including a pair of longitudinally extending side rails 12 and 14, the side rails being interconnected at the forward end of the frame by a rigid cross member 16. A collision bumper structure 18 including a bumper bar 20 is supported on the frame by a pair of identical energy absorbing units according to this invention and designated generally 22, each unit being rigidly attached to the corresponding one of the frame rails 12 and 14 by a front bracket 24 and a rear bracket 26. It will be understood, of course, that rather than the separate frame illustrated herein the support units according to this invention are equally well adapted for use with unibody or integral body-frame vehicle constructions.

Figure 2:
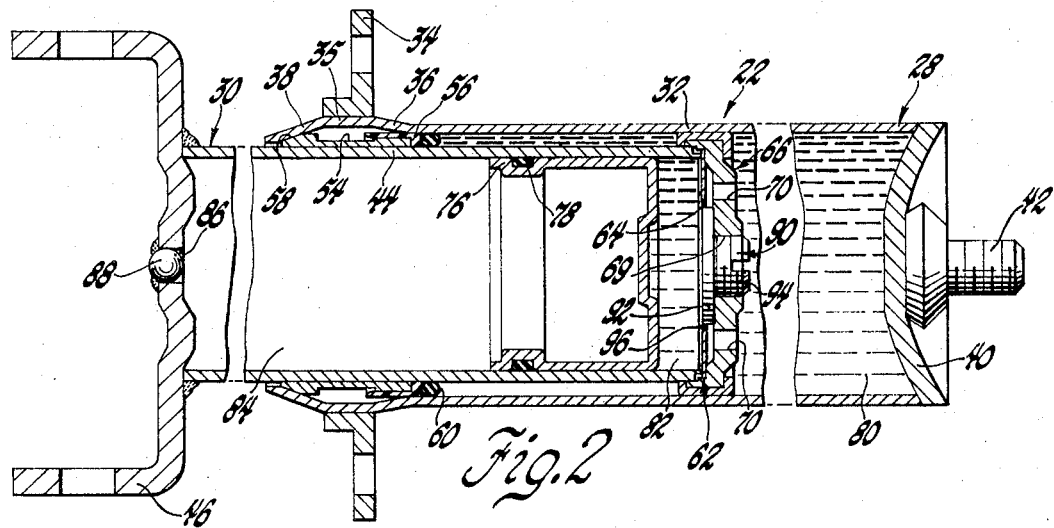
FIG. 2 is an enlarged sectional view taken generally along the plane indicated by lines 2—2 in FIG. 1.

Referring now to FIGS. 1 and 2 and describing in detail only one of the energy absorbing units 22, since the two illustrated are identical, the unit includes a cylinder tube subassembly 28 and a piston tube subassembly 30 disposed on the cylinder tube subassembly for relative telescopic bodily movement. The cylinder tube subassembly 28 includes a cylinder 32 having welded adjacent its leftward end a bracket 34 adapted for connection to the front bracket 24 on the frame 10. Generally, in the area of the bracket 34, the cylinder 32 includes a large diameter portion 35 flanked on opposite sides by a transitional frusto-conical portion 36 integral with the small diameter portion of the cylinder 32 and a similar frustoconical crimp stop portion 38. The rightward end of the cylinder 32 is closed by a cap 40 rigidly attached to the cylinder, as by welding. Exteriorly of the cap, the latter has rigidly attached thereto a stud 42 adapted for reception in an aperture in the bracket 26 and threaded so as to receive a nut for attachment to the bracket.

Figure 3:
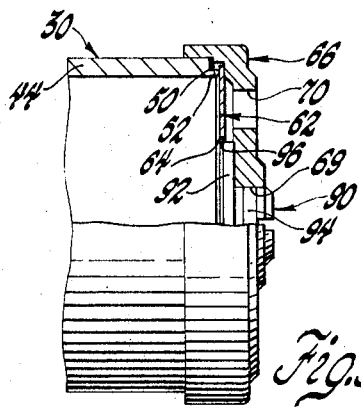
FIG. 3 is an enlarged partially broken-away view of a portion of the piston tube subassembly.
Figure 4:
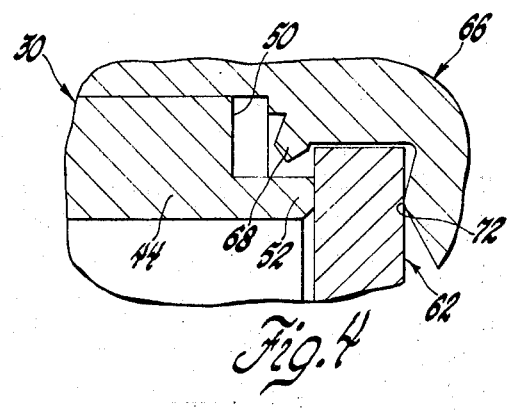
FIG. 4 is an enlarged view of a portion of FIG. 3.

As seen best in FIGS. 2, 3 and 4, the piston tube subassembly 30 includes a cylinder 44 sealingly closed at the left or outboard end by a clevis 46 welded to the cylinder, the clevis being adapted for rigid attachment to the bumper bar 20 through an attaching member 48, FIG. 1. Adjacent the rightward end thereof the cylinder 44 has formed thereon an annular land 50 and a circular rim portion 52 of reduced thickness. An annular stop ring 54 is rigidly attached, as by welding, to the cylinder 44 and includes a raised land over which is received a nylon bearing ring 56. The stop ring further includes a stop portion defining a frustoconical surface 58. An O-ring 60 is received over the cylinder 44 and abutted with an overlap portion of the bearing ring 56.

The piston tube subassembly further includes a valve element 62 in the form of a disc having a centrally located circular aperture 64 therein. The valve element 62 is initially loosely attached to an end cap 66 and retained thereon by a plurality of tabs 68, FIG. 4, integral with the end cap. The end cap 66 includes a centrally located threaded bore 69, a plurality of angularly spaced flow apertures 70, and an annular ridge 72 generally corresponding in diameter to the diameter of circular rim portion 52 on the cylinder 44. The end cap 66 is adapted for rigid connection, as by welding, to the right or inboard end of the cylinder 44. The valve element 62 is tightly captured between the circular rim portion 52 of the cylinder 44 and the annular ridge 72 on the end cap, FIG. 4.

A gas piston 76 is slidably received within the cylinder 44 and is provided with a suitable O-ring or like seal as at 78. The valve element 62 and the end cap 66 cooperate with the cylinder 32 and the cap 40 in defining a primary chamber 80 while the gas piston 76 cooperates with the valve element 62, the end cap 66 and the clevis 46 in defining a secondary chamber 82 and gas chamber 84. As seen best in FIG. 2, the primary and secondary chambers 80 and 82 are completely filled with an incompressible working fluid, as for example conventional hydraulic fluid, and the gas chamber 84 is filled with a gas under pressure, as for example nitrogen, the gas being introduced through a port 86 in the clevis 46 which is eventually sealed by a ball 88 welded in the port. The pressure of the gas forces the piston 76 rightwardly thereby to expel the working fluid from the secondary chamber 82, through the circular aperture 64 and the flow aperture 70, into the primary chamber 80 while simultaneously effecting telescopic extension of the piston tube subassembly relative to the cylinder tube subassembly to a fully extended condition, FIG. 2, wherein the stop surface 58 abuts the crimp stop portion 38. Conversely, impact forces on the bumper bar 20 are transmitted through the clevis 46 to the piston tube subassembly for effecting rightward telescopic diaplacement or collapse thereof relative to the cylinder tube subassembly during which collapse the working fluid is pressurized and expelled from the primary chamber 80, through the flow apertures 70 and the circular aperture 64, and into the secondary chamber 82. The working fluid displaced from the primary chamber effects expansion of the secondary chamber thereby forcing the piston 76 leftward relative to the cylinder 44 to compress the gas in the gas chamber 84. The compressed gas functions in a well known manner as a spring to restore the piston tube subassembly to the fully extended condition when the impact force on the bumper bar ceases.

As best seen in FIGS. 2 and 3, an adjusting member 90, including an enlarged cylindrical boss portion 92 and a threaded shank portion 94 integral with the boss portion is disposed on the end cap 66, the shank portion being threadedly received in the bore 69 on the end cap. The boss portion 92 cooperates with the circular aperture 64 in the valve element 62 in defining an annular throttling orifice 96 for the working fluid.

Referring particularly now to FIGS. 2 and 3 and describing in more detail the operative relation between the valve element and the adjusting member, the valve element is fabricated from any conventional resilient material, as for example spring steel, so that the valve element normally assumes a planar configuration corresponding to a closed position of the valve element, FIG. 2. The valve element, of course, is exposed through the apertures 70 to the pressure in the primary chamber 80, the apertures 70 being sufficiently large and numerous to avoid any significant pressure drop across the end cap 66. Accordingly, as the pressure in the primary chamber increases the valve element is distorted or deflected leftwardly relative to the piston tube subassembly in contilever fashion such as that the circular aperture 64, in effect, is shifted leftwardly relative to the end cap 66.

When the piston tube subassembly 30 is in the normal, fully extended condition, FIG. 2, with the pressure in the gas chamber 84 equaling the fluid pressure in the primary and secondary chambers 80 and 82, the valve element 62 assumes the closed position so that the throttling orifice 96 defined between the boss portion 92 and aperture 64 exhibits a minimum cross-sectional area. A force impact on the bumper bar 20, as described hereinbefore, initiates rightward telescopic collapse of the piston tube subassembly relative to the cylinder tube subassembly. As displacement of the piston tube subassembly commences, the pressure of the working fluid in the primary chamber increases and flow through the orifice 96 begins, the orifice effecting a pressure drop between the primary and secondary chambers so that the flow of working fluid is throttled for achieving primary absorption of the energy of impact on the bumper bar. The right surface of the valve element 62, of course, is exposed to the pressure in the primary chamber so that as such pressure increases the valve element deflects progressively from the closed position through a plurality of open positions, not shown, wherein the aperture 64 is shifted leftwardly relative to the cylinder 44. The particular open position finally assumed by the valve element depends on the pressure in the primary chamber and in each such open position the cross-sectional area of the orifice 96 exceeds the cross-sectional area of the orifice with the valve element in the closed position. Accordingly, the cross-sectional area of the orifice 96 in any open position of the valve element is directly proportional to the pressure in the primary chamber and hence to the magnitude of the impact force on the bumper bar.

During relative telescopic collapse of the piston tube subassembly, the expansion of the secondary chamber 82 effects compression of the gas in the chamber 84 so that when the impact force on the bumper bar ceases the piston 76 pressurizes the working fluid in the secondary chamber thereby to create a pressure differential between the secondary chamber and the primary chamber. Under these conditions, the valve element 62 deflects back or rightwardly from the particular open position achieved during telescopic collapse to the closed position thereby directing the return flow of working fluid from the secondary chamber to the primary chamber through the throttling orifice 96 which exhibits a predeterminedly small cross-sectional area. The cross-sectional area of the throttling orifice when the valve element is in the closed position is predetermined to effect throttling of the flow of working fluid between the secondary and primary chambers thereby to retard or damp the rate of relative telescopic extension of the piston tube subassembly by effecting secondary energy absorption.

The adjusting member 90 is adapted to alter the energy dissipation or absorption characteristics of the unit 22. More particularly, the threaded connection between the shank portion 94 and the end cap 66 permits leftward bodily shiftable movement of the adjusting member 90 relative to the valve element 62 when the adjusting member is rotated. Such movement causes the boss portion 92 of the adjusting member to project progressively further into the aperture 64 of the valve element which, of course, does not alter the cross-sectional area of the throttling orifice 96 with the valve element in the closed position. However, as the boss portion 92 projects further into the aperture 64 the cross-sectional area of the throttling orifice 96 corresponding to the various open positions of the valve element is reduced relative to the cross-sectional area available at that particular open position when the adjusting member is set against the end cap 66, FIGS. 2 and 3. Since leftward adjustment of the adjusting member 90 decreases the cross-sectional area of the throttling orifice, the energy dissipation capacity of the unit 22 increases with further leftward bodily shiftable movement of the adjusting member relative to the valve element. Accordingly, the energy dissipation characteristics of the unit can be tailored for any particular application by setting the adjusting member 90 at a predetermined position relative to the valve element prior to final assembly of the unit.

Having thus described the invention, what is claimed is:

1. In a hydropneumatic energy absorbing unit including a cylinder tube subassembly having a piston tube subassembly disposed thereon for relative telescopic bodily movement between an extended condition and a collapsed condition and a gas piston slidably disposed on said piston tube subassembly and defining therein a gas chamber filled with a gas under pressure, the combination comprising, a valve element disposed on said piston tube subassembly and cooperating with said cylinder tube subassembly in defining a primary chamber for a working fluid and with said gas piston in defining a secondary chamber for said working fluid, resilient means on said piston tube subassembly biasing said valve element toward a planar configuration, means defining a flow aperture in said valve element adapted for permitting flow of said working fluid between said primary and said secondary chambers during relative telescopic collapse and extension of said piston tube subassembly, an adjusting member disposed on said piston tube subassembly with a boss portion thereof projecting into said aperture and cooperating with the latter in defining a throttling orifice for said working fluid for effecting primary and secondary energy absorption during relative telescopic collapse and extension of said piston tube subassembly respectively, said throttling orifice creating a pressure differential across said valve element to deflect the latter from a closed position corresponding to the planar configuration of said valve element wherein the cross-sectional area of said orifice is minimum to an open position wherein the cross-sectional area exceeds the minimum in response to increasing pressure in said primary chamber so that the cross-sectional area of said throttling orifice is directly proportional to the pressure in said primary chamber, and means on said adjusting member and said piston tube subassembly adapting the former for bodily movement relative to the latter between a plurality of positions wherein said boss portion projects progressively further into said flow aperture.

2. In a hydropneumatic energy absorbing unit including a cylinder tube subassembly having a piston tube subassembly disposed thereon for relative telescopic bodily movement between an extended condition and a collapsed condition and a gas piston slidably disposed on said piston tube subassembly and defining therein a gas chamber filled with a gas under pressure, the combination comprising, a flexible valve disc disposed on said piston tube subassembly and cooperating with said cylinder tube subassembly in defining a primary chamber for a working fluid and with said gas piston in defining a secondary chamber for said working fluid, said valve disc being self-biased toward a planar configuration, means defining a centrally located circular flow aperture in said valve disc adapted for permitting flow of said working fluid between said primary and said secondary chambers during relative telescopic collapse and extension of said piston tube subassembly, an adjusting member disposed on said piston tube subassembly with a cylindrical boss portion thereof projecting into said aperture and cooperating with the latter in defining an annular throttling orifice for said working fluid for effecting primary and secondary energy absorption during relative telescopic collapse and extension of said piston tube subassembly respectively, said annular throttling orifice creating a pressure differential across said valve disc to deflect the latter from a closed position corresponding to the planar configuration of said valve disc wherein the cross-sectional area of said annular orifice is minimum to an open position wherein the cross-sectional area exceeds the minimum in response to increasing pressure in said primary chamber so that the cross-sectional area of said annular throttling orifice is directly proportional to the pressure in said primary chamber, and means on said adjusting member and on said piston tube subassembly defining a threaded connection therebetween so that said adjusting member is bodily shiftable relative to said piston tube subassembly between a plurality of positions wherein said boss portion projects progressively further into said circular flow aperture in response to relative rotation between said adjusting member and said piston tube subassembly.

3. In a hydropneumatic energy absorbing unit including a cylinder tube subassembly having a piston tube subassembly disposed thereon for relative telescopic bodily movement between an extended condition and a collapsed condition and a gas piston slidably disposed on said piston tube subassembly and defining therein a gas chamber filled with a gas under pressure, the combination comprising, a circular end cap having an annular ridge thereon and including a centrally located threaded bore and a plurality of passages, a flexible valve disc self-biased toward a planar configuration and having a centrally located circular aperture therein, means rigidly attaching said end cap to said piston tube subassembly with said valve disc captured between an annular surface portion of said piston tube subassembly and said annular ridge on said end cap so that said valve disc cooperates with said cylinder tube subassembly in defining a primary chamber for a working fluid and with said gas piston in defining a secondary chamber for said working fluid, said valve disc circular aperture permitting flow of said working fluid between said primary and said secondary chambers during relative telescopic collapse and extension of said piston tube subassembly, and an adjusting member including a cylindrical boss portion and a threaded stud adapted for reception in said threaded bore in said end cap thereby to support said adjusting member on said piston tube subassembly with said boss portion projecting into said circular aperture and cooperating with the latter in defining an annular throttling orifice for said working fluid for effecting primary and secondary energy absorption during relative telescopic collapse and extension of said piston tube subassembly respectively, said annular throttling orifice creating a pressure differential across said valve disc to deflect the latter from a closed position corresponding to the planar configuration of said valve disc wherein the cross-sectional area of said orifice is minimum to an open position wherein the cross-sectional area exceeds the minimum in response to increasing pressure in said primary chamber so that the cross-sectional area of said throttling orifice is directly proportional to the pressure in said primary chamber, and said adjusting member being bodily shiftable relative to said piston tube subassembly between a plurality of positions wherein said boss portion projects progressively further into said circular flow aperture.

* * * * *